United States Patent [19]

Delmas et al.

[11] 4,070,529
[45] Jan. 24, 1978

[54] SOLID ELECTROLYTE

[75] Inventors: Claude Delmas, Merignac; Claude Fouassier, Gradignan; Paul Hagenmuller, Merignac, all of France

[73] Assignee: Agence Nationale de Valorisation de la Recherche (Anvar), Neuilly-sur-Seine, France

[21] Appl. No.: 703,141

[22] Filed: July 7, 1976

[51] Int. Cl.$^2$ .............................................. H01M 6/18
[52] U.S. Cl. ...................................... 429/193; 106/57; 204/195 S; 423/608
[58] Field of Search ........................ 429/191, 193, 104; 106/39.5, 57, 63; 204/195 S; 423/608

[56] References Cited
U.S. PATENT DOCUMENTS 3,829,331  8/1974  Tsang .................................... 429/193
3,980,499  9/1976  Bither et al. .......................... 429/191

OTHER PUBLICATIONS

Goodenough et al, Solid Electrolytes: Alkali Ion Transport in Skeleton Structures, Dec. 1975, Abstract published in Energy Production and Conversion, N76–30680.

Primary Examiner—Donald L. Walton
Attorney, Agent, or Firm—Townsend & Townsend

[57] ABSTRACT

The invention relates to lamelliform oxides of high ionic conductivity which contain monovalent elements inserted between lamellae of oxides of the type $(L_xM_{1-x})O_2$ wherein L is a trivalent element, M is a tetravalent element and $x$ is a number between 0 and 1. Such oxides are useful as solid electrolytes in electrochemical generators or cells.

9 Claims, 1 Drawing Figure

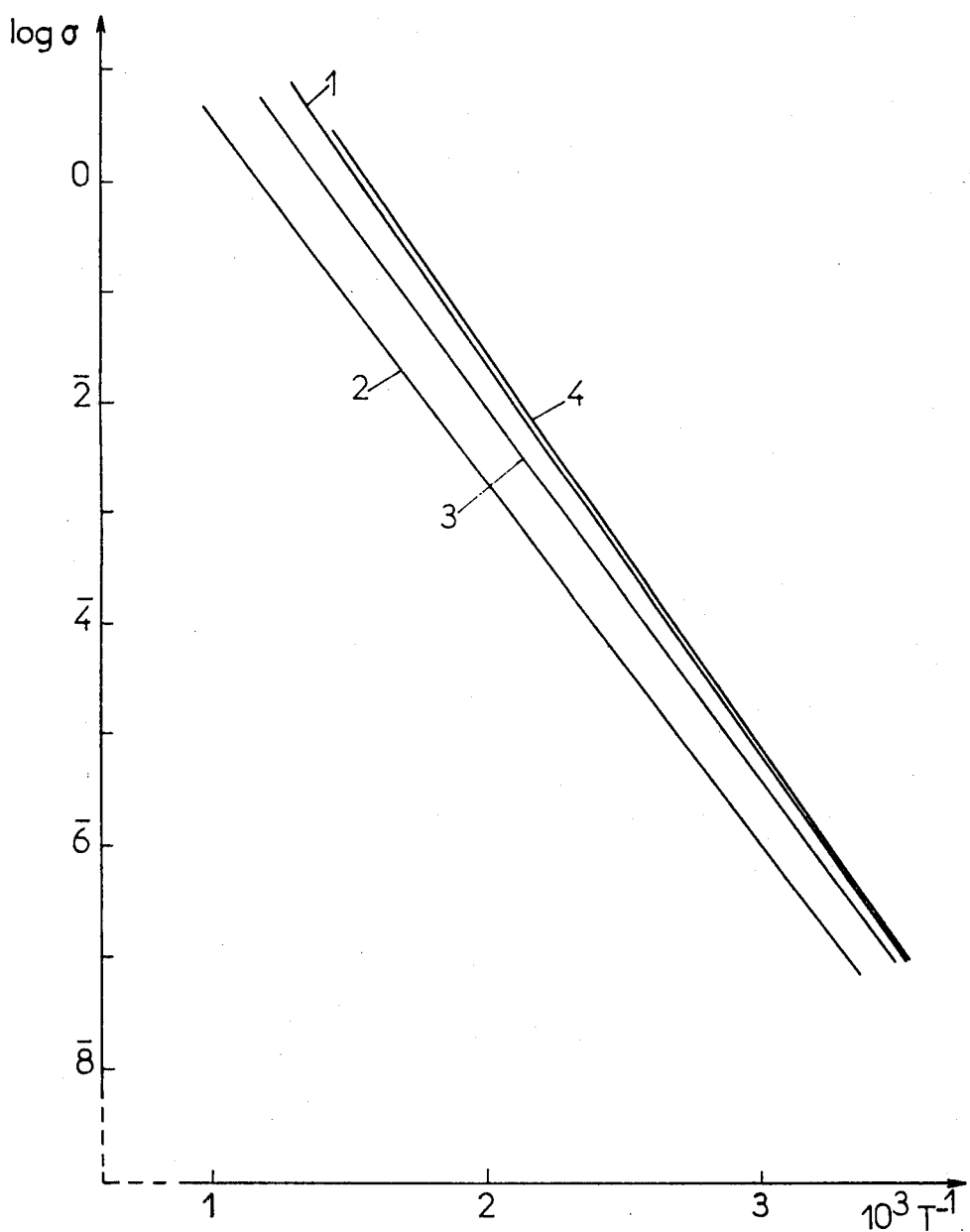

SOLID ELECTROLYTE

This invention relates to lamelliform oxides of high ionic conductivity.

It also relates to processes for their preparation and to their electrochemical applications, in particular as solid electrolytes in electrochemical generators such as electric cells and accumulators.

In order that a given compound may be suitable for use as solid electrolyte, it must be both an electronic insulator and an ionic, cationic or anionic conductor.

One cationic electrolyte of this type which is widely used consists of an alumina derivative, namely $\beta$-alumina, which has a conductivity of from $5 \times 10^{-2} \Omega^{-1} cm^{-1}$ at 100° C to $6 \times 10^{-1} \Omega^{-1} cm^{-1}$ at 350° C (these dimensions are taken in the direction of conduction of a monocrystal).

Other cationic conductors which have a high conductivity are also known, but these compounds are in addition electronic conductors and therefore cannot be used as solid electrolytes in electrochemical generators or cells.

These compounds consist of lamelliform oxides of the type $$A_x(RO_2)$$

in which $A$ represents a monovalent element, in particular an alkali metal, $R$ represents a transition metal and $z$ represents a number of between 0 and 1.

In these compounds, cationic conduction is due to the mobility of the monovalent cations inserted between the layers of $RO_2$. The nature of R in these compounds, however, is not such as to prevent electronic conduction in these layers, and for the applications envisaged above these compounds therefore have the disadvantage of also being electronic conductors.

The inventors discovered that it was possible to obtain lamelliform oxides which were both electronic insulators and cationic conductors. These oxides comprise layers of the formula $$(L_yM_{1-y})O_2 \quad (I)$$

between which monovalent elements are inserted.

In the above formula, each of the two elements L and M is present in the said layers in only one degree of oxidation, the degree of oxidation of L being less by at least one unit than that of M, and $y$ being a number of between 0 and 1. In order completely to prevent any electronic conductivity, the elements L and M are chosen from among those which either exist in only one state of oxidation or in which, if there are several possible degrees of oxidation, one of them is very stable in relation to the others.

In one preferred family of lamelliform oxides, M is an element of Group IV of the Periodic Classification of Elements, L is an element of Group III and the respective proportions of and the monovalent element A are identical and represented by a number $x$ which has a value of between 0 and 1 such that the system is monophasic.

This family corresponds to formula II $$A_x(L_xM_{1-x})O_2 \quad (II)$$

In one preferred group of this family, M is chosen from among zirconium, hafnium and tin and $x$ represents a number having a value of about 0.72.

In another preferred group of this family, M is lead and $x$ is between about 0.67 and 0.80.

In the groups indicated above, L advantageously represents indium or scandium and A potassium or rubidium. The element A may advantageously also represent lithium, sodium or silver.

According to another embodiment of this invention, the element A is partially substituted by a monovalent element D other than A in a proportion $a$ of between O and $x$.

The corresponding oxides are represented by formula III $$(A_{x-a}D_a)(L_xM_{1-x})O_2 \quad (III)$$

In one group of this family, A advantageously represents a monovalent element, in particular potassium or rubidium, D is a monovalent element different from A, in particular sodium, $a$ is a number of between O and $x$, and L, M and $x$ have the meanings indicated above.

The preferred oxides correspond to formula III above in which A represents potassium, D sodium and $a$ a value of about 0.25 and L, M and $x$ have the meanings indicated above.

One thus has at ones disposal lamelliform oxides which are free from any electronic conductivity while being excellent cationic conductors within the temperature range employed in industrial processes. Like alumina, they constitute two-dimensional conductors by virtue of their lamelliform structure but they have the advantage that their conductivity is generally higher than that of alumina. Moreover, they have a lower melting point than alumina so that they can be sintered at much lower temperatures than those employed for alumina.

Their properties make these oxides particularly suitable for the manufacture of solid electrolytes. The invention therefore also concerns the application of the lamelliform oxides mentioned above as solid electrolytes for accumulators such as electrochemical generators and cells and in particular but not exclusively in cells using alkali-sulphur or alkali-oxygen couples. It also covers accumulators containing these solid electrolytes.

The lamelliform oxides according to the invention may be prepared from oxides or hydroxides of the corresponding elements. These oxides or hydroxides are subjected to a heat treatment at a sufficiently high temperature and for a sufficient length of time to complete the reaction, if indicated under an oxidizing atmosphere.

In order to obtain the lamelliform oxides according to the invention having the characteristics mentioned above, the starting materials are put into the process in the stoichiometric proportions required for obtaining a monophasic system.

According to one method of carrying out the process of the invention, the alkali metal is used in the form of the hydroxide, and the mixture of this hydroxide with the aforesaid starting material, preferably sifted to select particles of the order of 100$\mu$, is subjected to a heat treatment at a temperature of the order of 400° to 700° C, preferably about 500° C, and the product is then crushed to a powder before it is reheated to a temperature of about 800° to 1200° C preferably about 1000° C.

These heat treatments are carried out in an oxidizing atmosphere if indicated.

According to another method of carrying out the process of the invention, the alkali metal is used in the form of its oxide and the required oxides are synthesized directly by subjecting the mixture of starting materials to a heat treatment at a temperature of about 800° to 1000° C.

The resulting product is compressed and sintered at a sufficiently high temperature to produce an oxide with a very high degree of compaction, in particular above 90%. Sintering is carried out in an anhydrous and if applicable oxidizing atmosphere at a temperature below but close to the melting point of the oxide produced.

Other features of the invention will be apparent from the examples which follow and the single FIGURE in which the variation of the logarithm of the conductivity of the lamelliform oxides accoring to the invention in terms of $\Omega^{-1} cm^{-1}$ is plotted as a function of $10^3 T^{-1}$ where T is the absolute temperature expressed in Kelvin degrees.

EXAMPLE 1

An oxide of the formula:

$$K_{0.72}(In_{0.72}Sn_{0.28})O_2$$

is prepared from 2.424 g of KOH, 5.997 g of $In_2O_3$ and 2.532 g of $SnO_2$. The starting materials, which are in the form of a powder, are crushed for about ½ hour to form an intimate mixture. This mixture is then introduced into an alumina crucible and subjected to a temperature of about 500° C for about 5 hours in an oxidizing atmosphere. The resulting product is crushed and again heat treated, this time at a temperature of the order of 1000° C for about 15 hours.

In order to diminish the losses of potassium oxide by volatilisation during this second heat treatment, the operation is carried out on large masses of material with the smallest possible surfaces of contact with the atmosphere.

The product obtained from this treatment is pressed and then sintered at 1000° C for 1 hour in a stream of oxygen.

The ionic conductivity of the resulting oxide $K_{0.72}(In_{0.72}Sn_{0.28})O_2$ is 0.7 $\Omega^{-1} cm^{-1}$ at 350° C.

When the process is repeated with another suitable oxide of the type $MO_2$ instead of $SnO_2$, the lamelliform oxides summarized in the Table below are obtained. For each of these compounds, the table shows the oxide $MO_2$ used as starting material and the quantity put into the process. It also shows the ionic conductivity of the lamelliform oxides obtained.

| Example | Oxide | $NO_2$ Quantity in g | in $\Omega^{-1}$ cm |
|---|---|---|---|
| No. 2 | $H_{0.72}(In_{0.72}Zr_{0.28})O_2$ | $ZrO_2$ 2.070g | 0.05 |
| No. 3 | $K_{0.72}(In_{.72}Hf_{0.28})O_2$ | $HfO_2$ 3.537g | 0.6 |

EXAMPLE 4

An oxide of the formula $(K_{0.58}Na_{0.14})(In_{0.72}Sn_{0.28})O_2$ is prepared from
1.953 g of KOH,
0.336 g of NaOH,
5.997 g of $In_2O_3$,
2.532 g of $SnO_2$.

This mixture is then treated as in Example 1. The ionic conductivity of the oxide obtained is $0.8\Omega^{-1}cm^{-1}$ at 350° C.

It is found that the lamelliform oxides obtained in these Examples have a remarkably high ionic conductivity.

Inspection of the FIGURE shows for each of the oxides obtained in Examples 1 to 4, indicated respectively by the reference numerals 1 to 4 on the FIGURE, the high mobility of the potassium ions in the layers between the lamellae of the type $L_xM_{1-x}O_2$.

We claim:

1. Lamelliform oxides characterised by the fact that they contain monovalent elements inserted between lamellae of the formula I $$(L_yM_{1-y})O_2 \tag{I}$$

wherein each of the two elements L and M is present in the said lamellae in only one degree of oxidation, the degree of oxidation of L being lower by at least one unit than that of M, the said elements being selected from compounds which either have only one degree of oxidation or have one degree of oxidation which is very stable in the presence of others if more than one exists, y being a number of between 0 and 1.

2. Lamelliform oxides according to claim 1, characterised by the fact that they correspond to formula II $$A_x(L_xM_{1-x})O_2 \tag{II}$$

wherein $A$ represents a monovalent element and $x$ is a number of between 0 and 1, L is a trivalent element and M is a tetravalent element.

3. Oxides according to claim 2, characterised by the fact that M is selected from the group comprising zirconium, hafnium and tin and x is a number of about 0.72.

4. Oxides according to claim 2, characterised by the fact that M represents lead and x has a value between about 0.67 and 0.80.

5. Oxides according to claim 2, characterised by the fact that L represents one of indium and scandium and A represents one of potassium and rubidium.

6. Lamelliform oxides according to claim 1, characterised by the fact that they correspond to formula III $$(A_{x-a}D_a)(L_xM_{1-x})O_2 \tag{III}$$

wherein $A$, $L$, $M$ and $x$ have the meaning indicated above and D is a monovalent element different from A, $a$ being a number between 0 and x.

7. Oxides according to claim 6, characterised by the fact that A represents one of potassium and rubidium, D represents sodium, $a$ is equal to 0.25 and L, M and x have the meaning indicated above.

8. Process for manufacturing a solid electrolyte comprising using the lamelliform oxide set forth in claim 1.

9. Electrochemical accumulator such as electrochemical generator or cell, characterised in that it comprises a solid electrolyte according to claim 8.

* * * * *

UNITED STATES PATENT AND TRADEMARK OFFICE
CERTIFICATE OF CORRECTION

PATENT NO. : 4,070,529
DATED : January 24, 1978
INVENTOR(S) : CLAUDE DELMAS et al.

It is certified that error appears in the above-identified patent and that said Letters Patent are hereby corrected as shown below:

Column 3, line 66, delete "$H_{0.72}$" and substitute therefor --$K_{0.72}$--.

Signed and Sealed this

Eleventh Day of July 1978

[SEAL]

Attest:

RUTH C. MASON
Attesting Officer

DONALD W. BANNER
Commissioner of Patents and Trademarks